UNITED STATES PATENT OFFICE.

ALONZO FARRAR, OF BROOKLINE, MASSACHUSETTS.

IMPROVEMENT IN PROCESSES OF REFINING PETROLEUM.

Specification forming part of Letters Patent No. 138,237, dated April 29, 1873; application filed February 26, 1873.

*To all whom it may concern:*

Be it known that I, ALONZO FARRAR, of Brookline, of the county of Norfolk and State of Massachusetts, have invented a new and useful Process of Refining Petroleum or Coal-Oil, or the oil derived from the purification of what is termed "spent acid;" that is, sulphuric acid used in refining coal-oil or petroleum; and I do hereby declare the same to be fully described as follows:

In refining spent acid, in accordance with the first part of the process of Robert G. Loftus, patented June 14, 1864, the substance or composition of oil and acid is mixed with water, the mixture agitated and suffered to stand, and afterward the oil is drawn away from the acid substance, which is subsequently further treated. The oil thus drawn off contains more or less acid, which operates to its injury, or so thickens it as to prevent it from being successfully employed as a paint oil, or for various other purposes in the arts. This oil I take at once from the tanks, or after its production, and mix it with water in like quantity, or thereabout, and agitate the whole for a half an hour, or sufficient period, and next allow the mixture to stand and settle. Next, I draw off the water, leaving the oil in the tank. Next, I add water to the oil, and again agitate the mixture, and allow it to stand and settle; and I repeat the process until the acid may be sufficiently separated from the oil. Next, the oil is to be heated, either by steam or other suitable means, to a temperature of about 300° Fahrenheit, and be maintained at such temperature until the water may be entirely evaporated from the oil.

In treating petroleum or crude oil I mix with it a suitable amount of sulphuric acid—such as twenty-five pounds of acid to one hundred gallons of the petroleum or crude coal-oil—after which I subject the mixture to repeated washings or mixtures with water, agitating them in the meanwhile, allowing them to settle, and drawing off the acid and water, and finally subjecting the oily residue to heat, so as to evaporate the water left in it. The process, after the addition of the acid to the oil, is like that hereinbefore described with reference to the purification of the oil obtained in Loftus's process, as mentioned.

I make no claim to either of the modes of refining oil described in the United States Patents Nos. 91,654, 110,638, as my process, though somewhat analogous, differs therefrom in important particulars. In the first place, I do not use any alkali with one subsequent washing to the oil, but I subject the oil to repeated washings and settlings; and, finally, instead of warming it to about 100°, I subject it to a very much higher temperature—viz: about 300° Fahrenheit—and keep it so until the water contained in it is thoroughly evaporated.

By the quick evaporation of the water the remaining acid, if any, is all carried off; whereas, at the low temperature of 100°, such result cannot be effected. Furthermore, I have no occasion to wash the acids of the agitator in order to get rid of the tarry accumulation thereon. I am enabled, by my process, to avoid the use of an alkali, and thereby to effect the purification of the oil in a readier and cheaper manner than that set forth in the first-named of such patents. In the process described in the second of such patents, though water is used with the oil, there is no subsequent heating of the oil, as in my process.

I claim as my invention as follows, viz:

The process above described, of treating petroleum or crude coal-oil after mixture with sulphuric acid; or of treating the oil obtained from the spent acid used in refining petroleum or coal-oil.

ALONZO FARRAR.

Witnesses:
 R. H. EDDY,
 J. R. SNOW.